US009727188B2

(12) United States Patent
Zhai et al.

(10) Patent No.: US 9,727,188 B2
(45) Date of Patent: Aug. 8, 2017

(54) TOUCH DISPLAY PANEL AND ELECTRONIC EQUIPMENT (71) Applicants: Shanghai Tianma Micro-Electronics Co., Ltd., Shanghai (CN); Tianma Micro-Electronics Co., Ltd., Shenzhen (CN)

(72) Inventors: Yingteng Zhai, Shanghai (CN); Yong Wu, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

(*) Notice: Subject to any disclaimer, the term of this patent is extended or adjusted under 35 U.S.C. 154(b) by 30 days.

(21) Appl. No.: 14/737,493

(22) Filed: Jun. 12, 2015

(65) Prior Publication Data

US 2016/0170525 A1 Jun. 16, 2016

(30) Foreign Application Priority Data

Dec. 12, 2014 (CN) .......................... 2014 1 0768840

(51) Int. Cl.
*G06F 3/045* (2006.01)
*G06F 3/044* (2006.01)
*G09G 3/22* (2006.01)
*G09G 3/20* (2006.01)
(Continued)

(52) U.S. Cl.
CPC ............ *G06F 3/044* (2013.01); *G06F 3/0416* (2013.01); *G09G 3/20* (2013.01); *G09G 3/22* (2013.01); *G09G 3/36* (2013.01); *G09G 2300/023* (2013.01); *G09G 2300/0426* (2013.01); *G09G 2310/0286* (2013.01); *G09G 2310/0291* (2013.01); *G09G 2320/0223* (2013.01)

(58) Field of Classification Search
CPC . G06F 3/044; G09G 3/20; G09G 3/22; G09G 3/36; G09G 2300/00; G09G 2300/02; G09G 2300/023; G09G 2290/00
See application file for complete search history.

(56) References Cited

U.S. PATENT DOCUMENTS

| 5,392,058 A * | 2/1995 | Tagawa ................ B25J 19/0012 345/103 |
| 2012/0038585 A1* | 2/2012 | Kim ...................... G06F 3/0412 345/174 |

(Continued)

FOREIGN PATENT DOCUMENTS

| CN | 101145318 A | 3/2008 |
| CN | 101567174 A | 10/2009 |
| CN | 203503280 U | 3/2014 |

(Continued)

*Primary Examiner* — Kent Chang
*Assistant Examiner* — Mark Edwards
(74) *Attorney, Agent, or Firm* — Faegre Baker Daniels LLP (57) ABSTRACT A touch display panel, including a touch display unit and drive circuit units disposed at the periphery of the touch display unit. The touch display unit includes touch drive electrodes, the drive circuit unit includes a first drive circuit unit and a second drive circuit unit which are electrically connected with two ends of each of the touch drive electrodes, respectively, and the first drive circuit unit is electrically connected with the second drive circuit unit through a first connecting line.

11 Claims, 7 Drawing Sheets (51) Int. Cl.
*G09G 3/36* (2006.01)
*G06F 3/041* (2006.01)

(56) References Cited

U.S. PATENT DOCUMENTS

| | | | | |
|---|---|---|---|---|
| 2014/0292709 A1* | 10/2014 | Mizuhashi | ............ | G06F 3/0416 345/174 |
| 2014/0333547 A1* | 11/2014 | Yi | ......................... | G06F 3/0416 345/173 |

FOREIGN PATENT DOCUMENTS

| CN | 103996371 A | 8/2014 |
|---|---|---|
| KR | 20100019014 A | 2/2010 |
| TW | I410942 B | 11/2009 |

\* cited by examiner

TOUCH DISPLAY PANEL AND ELECTRONIC EQUIPMENT

CROSS-REFERENCE TO RELATED APPLICATION

This application claims priority to Chinese Application No. 201410768840.2, filed Dec. 12, 2014, which is herein incorporated by reference in its entirety.

TECHNICAL FIELD

The present disclosure relates to a touch display technology, and particularly relates to a touch display panel and electronic equipment.

BACKGROUND

With rapid development of display technology in recent years, a touch display device capable of receiving information inputs, in which a touch device is mounted on a display device such as a Liquid Crystal Display (LCD) device or a touch device is integrated with a display device and various button images and the like are displayed on the display device in place of conventional mechanical buttons, arouses attentions. Because the touch display device does not need input devices such as a keyboard, a mouse and a keypad, the touch display device is increasingly applied to portable terminals such as mobile phones.

For a touch display panel, scanning circuits are generally disposed at the periphery of the display panel and connected typically in three manners, a double-side scanning manner in which the same drive electrode is driven for scanning by individual wirings from two sides of the display panel, a single-side scanning manner in which each drive electrode is driven for scanning by an individual wiring on one side of the display panel, and a double-side interleaved scanning manner in which drive electrodes are respectively driven for scanning by individual wirings on two sides of the display panel. In the case of the double-side scanning manner, identical scanning circuits are required on two sides of the display panel to drive the same drive electrode for synchronous scanning, as a result, the whole touch display panel cannot normally complete scanning if only the scanning circuit on one side of the display panel fails. In the case of the single-side scanning manner or the double-side interleaved scanning manner, because a touch drive signal/VCOM signal is supplied only from a single side of the display panel, a voltage drop is caused at the distal end of the drive electrode, thereby negatively affecting the scanning of the touch display panel and normal display of the LCD device.

SUMMARY

In view of this, embodiments of the disclosure provide a touch display panel and electronic equipment for solving the problems in the related art.

Embodiments of the disclosure provide a touch display panel, including a touch display unit and drive circuit units disposed at the periphery of the touch display unit. The touch display unit includes touch drive electrodes, the drive circuit unit includes a first drive circuit unit and a second drive circuit unit which are electrically connected with two ends of each of the touch drive electrodes, respectively, and the first drive circuit unit is electrically connected with the second drive circuit unit through a first connecting line.

Embodiments of the disclosure further provide electronic equipment, including the above-mentioned touch display panel.

With the touch display panel and the electronic equipment provided by the embodiments of the disclosure, single-side scanning drive and double-side signal transmission may be realized, the synchronism of signals is improved based on the improved yield, and the problem of voltage drop is solved.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

To illustrate technical solutions of the embodiments of the disclosure, a brief introduction on the accompanying drawings used for the description of the embodiments is given below. The accompanying drawings for the description below illustrate some of the embodiments of the disclosure. Other drawings may be derived from the accompanying drawings.

While the disclosure is amenable to various modifications and alternative forms, embodiments have been shown by way of example in the drawings and are described in detail below. The intention, however, is not to limit the disclosure to the embodiments described. On the contrary, the disclosure is intended to cover all modifications, equivalents, and alternatives falling within the scope of the disclosure as defined by the appended claims.

DETAILED DESCRIPTION

The technical solutions in the disclosure will be described in combination with the accompanying drawings. The embodiments described are a part, but not all, of the embodiments of the disclosure. Other embodiments obtained by those of ordinary skill in the art in light of the described embodiments of the disclosure fall into the protection scope of the disclosure.

Figure 1:
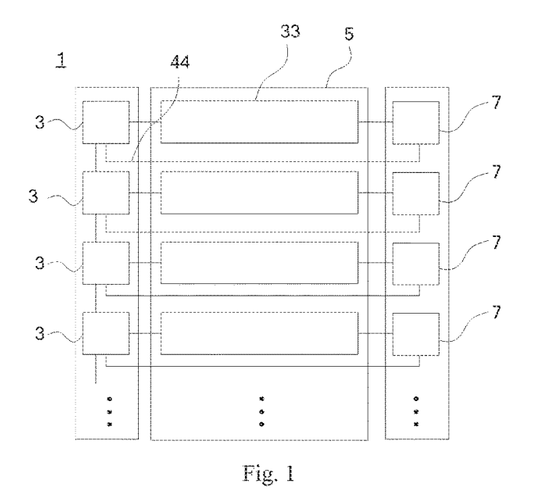
FIG. 1 is a simplified structural diagram of a touch display panel, according to embodiments of the disclosure.

A scanning circuit includes three modules, that is, a shift register module, a multi-channel strobe module and an output module. The scanning circuit is electrically connected with drive electrodes (which are reused as a common electrode) in a touch display panel through connecting lines, so that a touch drive signal and a display VCOM signal output from an Integrated Circuit (IC) chip can be sequentially transmitted through the above three modules to the drive electrodes. FIG. 1 shows a simplified structural diagram of a touch display panel 1, according to embodiments of the disclosure. The touch display panel 1 includes a touch display unit 5 and drive circuit units disposed on both sides of the touch display unit 5. The touch display unit 5 includes a plurality of touch drive electrodes 33, the drive circuit unit includes a first drive circuit unit 3 and a second drive circuit unit 7 which are electrically connected with two ends of each of the touch drive electrodes 33, respectively, and the first drive circuit unit 3 is electrically connected with the second drive circuit unit 7 through a first connecting line 44.

Figure 2:
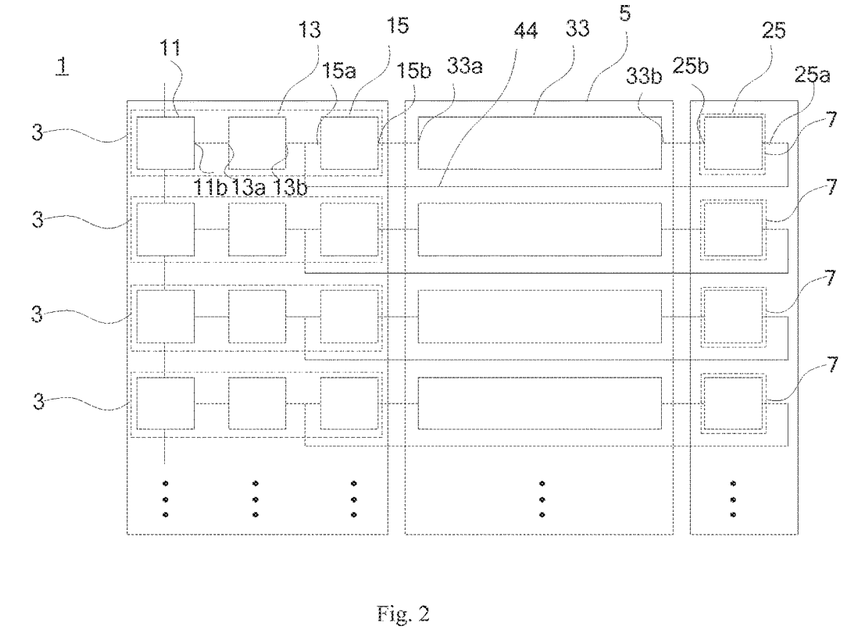
FIG. 2 is a schematic structural diagram of a drive circuit of a touch display panel, according to embodiments of the disclosure.

FIG. 2 is a schematic structural diagram of a drive circuit of the touch display panel 1, according to embodiments of the disclosure. As shown in FIG. 2, the first drive circuit unit 3 includes a first shift register unit 11, a first multi-channel strobe unit 13 and a first output unit 15 which are sequentially electrically connected. An output end 11b of the first shift register unit 11 is electrically connected with an input end 13a of the first multi-channel strobe unit 13, an output end 13b of the first multi-channel strobe unit 13 is electrically connected with an input end 15a of the first output unit 15, and an output end 15b of the first output unit 15 is electrically connected with a first end 33a of the touch drive electrode 33. The second drive circuit unit 7 includes a second output unit 25, and an output end 25b of the second output unit 25 is electrically connected with a second end 33b of the touch drive electrode 33. The output end 13b of the first multi-channel strobe unit 13 is electrically connected with the input end 25a of the second output unit 25 through a first connecting line 44. With such structure, a signal output from the output end 13b of the first multi-channel strobe unit 13 may be simultaneously transmitted to both the first output unit 15 and the second output unit 25 and finally transmitted to the two ends of the touch drive electrode 33. In some embodiments, the first connecting line 44 is a metal transmission line, thus alleviating problems such as a signal delay and a voltage drop and maintaining the uniformity of signal transmission. Meanwhile, the shift register units are arranged only on one side of the touch display unit 5, thus the solution in some embodiments of the disclosure is advantageous in that the overall damage probability of the shift register units is reduced and the product yield is improved compared with a traditional solution where shift register units are arranged on both sides of the touch display unit.

Figure 3:
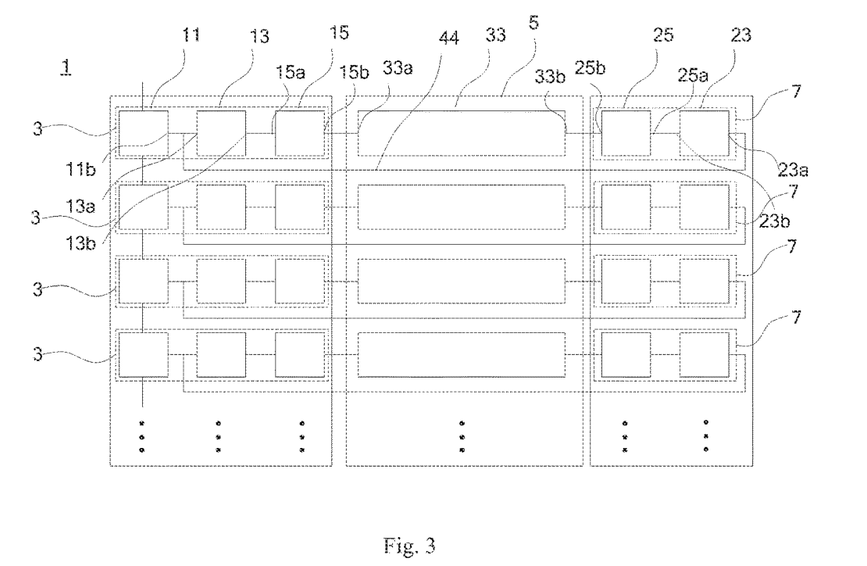
FIG. 3 is a schematic structural diagram of a drive circuit of another touch display panel, according to embodiments of the disclosure.

It should be noted that the structure of the drive circuit in the touch display panel 1, according to embodiments of the disclosure, is not limited to the embodiments shown in FIG. 2. FIG. 3 shows a schematic structural diagram of another touch display panel 1, according to embodiments of the disclosure. As shown in FIG. 3, the first drive circuit unit 3 includes a first shift register unit 11, a first multi-channel strobe unit 13 and a first output unit 15 which are sequentially electrically connected, where an output end 11b of the first shift register unit 11 is electrically connected with an input end 13a of the first multi-channel strobe unit 13, an output end 13b of the first multi-channel strobe unit 13 is electrically connected with an input end 15a of the first output unit 15, and an output end 15b of the first output unit 15 is electrically connected with the first end 33a of a touch drive electrode 33. The second drive circuit unit 7 includes a second multi-channel strobe unit 23 and a second output unit 25 which are electrically connected with each other, where an output end 23b of the second multi-channel strobe unit 23 is electrically connected with an input end 25a of the second output unit 25, and an output end 25b of the second output unit 25 is electrically connected with a second end 33b of the touch drive electrode 33. The output end 11b of the first shift register unit 11 is electrically connected with an input end 23a of the second multi-channel strobe unit 23 through a first connecting line 44. Here, in some embodiments, the first connecting line 44 is a metal transmission line, thus alleviating problems such as a signal delay and a voltage drop, and maintaining the uniformity of signal transmission. Meanwhile, the shift register units are arranged only on one side of the touch display unit 5, thus the solution in the embodiments of the disclosure is advantageous in that the overall damage probability of the shift register units is reduced and the product yield is improved compared with a traditional solution where shift register units are arranged on two sides of the touch display unit.

Figure 4:
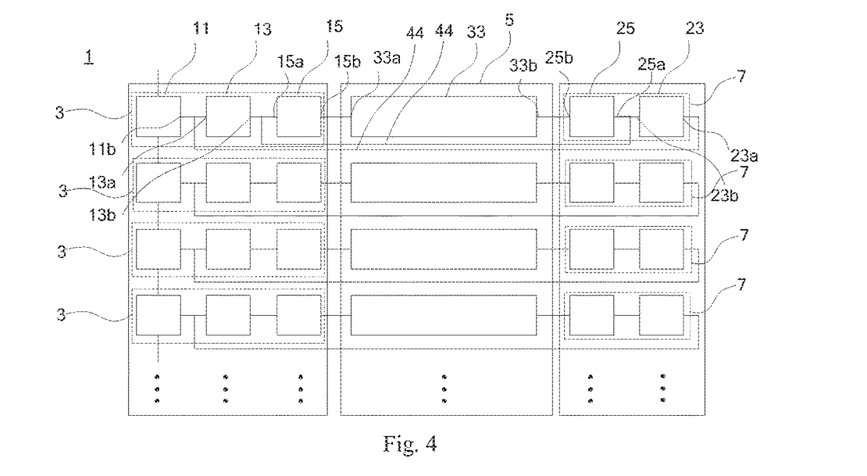
FIG. 4 is a schematic structural diagram of a drive circuit of another touch display panel, according to embodiments of the disclosure.

FIG. 4 is a schematic structural diagram of another touch display panel 1, according to embodiments of the disclosure. In FIG. 4, the first drive circuit unit 3 includes a first shift register unit 11, a first multi-channel strobe unit 13 and a first output unit 15 which are sequentially electrically connected, where an output end 11b of the first shift register unit 11 is electrically connected with an input end 13a of the first multi-channel strobe unit 13, an output end 13b of the first multi-channel strobe unit 13 is electrically connected with an input end 15a of the first output unit 15, and an output end 15b of the first output unit 15 is electrically connected with a first end 33a of a touch drive electrode 33. The second drive circuit unit 7 includes a second multi-channel strobe unit 23 and a second output unit 25 which are electrically connected with each other, where an output end 23b of the second multi-channel strobe unit 23 is electrically connected with an input end 25a of the second output unit 25, and an output end 25b of the second output unit 25 is electrically connected with a second end 33b of the touch drive electrode 33. Where, the output end 11b of the first shift register unit 11 is electrically connected with an input end 23a of the second multi-channel strobe unit 23 through a first connecting line 44. Meanwhile, the output end 13b of the first multi-channel strobe unit 13 is electrically connected with the input end 25a of the second output unit 25 through the first connecting line 44. Here, in some embodiments, the first connecting lines 44 are metal transmission lines, thus alleviating problems such as a signal delay and a voltage drop, and maintaining the uniformity of signal transmission. Meanwhile, the shift register units are arranged only on one side of the touch display unit 5, thus the solution in the embodiments of the disclosure is advantageous in that the overall damage probability of the shift register units is reduced and the product yield is improved compared with a traditional solution where shift register units are arranged on two sides of the touch display unit.

It should be noted that, in some embodiments of FIGS. 2 to 4, the first connecting lines 44 are made of metal with resistance as low as possible, thus alleviating problems such as a signal delay and a voltage drop, and maintaining the uniformity of signal transmission. In addition, the first connecting lines 44 may be a metal layer disposed in the touch display panel and manufactured separately, or may be manufactured on the same layer as a gate metal layer or a source-drain metal layer. With respect to some embodiments of FIGS. 2 to 4 where the first drive circuit unit 3 and the second drive circuit unit 7 are respectively disposed on the left and right sides of the touch display unit 5, the first connecting lines 44 may be a metal layer disposed in the touch display panel and manufactured separately or may be manufactured on the same layer as the gate metal layer. In some embodiments, the first connecting lines 44 are manufactured on the same layer as the gate metal layer. Because the gate metal layer is provided with gate scanning lines (not shown) running through the whole touch display panel in the transverse direction, when the first connecting lines 44 are manufactured on the same layer as the gate metal layer, the first connecting lines 44 may be parallel to the gate scanning lines, thus more facilitating wiring.

It should be noted that, the first drive circuit unit 3 and the second drive circuit unit 7 are not limited to being respectively disposed on the left and right sides of the touch display unit 5 as described in embodiments of FIGS. 2 to 4, but may also be respectively disposed on the upper and lower sides of the touch control display unit 5, where the connection modes among the first shift register unit 11, the first multi-channel strobe unit 13, the first output unit 15, the second multi-channel strobe unit 23, the second output unit 25 and the touch drive electrode 33 are the same as those of the foregoing embodiments. The difference lies in that when the first drive circuit unit 3 and the second drive circuit unit 7 are respectively disposed on the upper and lower sides of the touch control display unit 5, in some embodiments, the first connecting lines are arranged on the same layer as the source-drain metal layer in the touch display panel. Because the source-drain metal layer is provided with data lines (not shown) running through the whole touch display panel in the longitudinal direction, when the first connecting lines are manufactured on the same layer as the source-drain metal layer, the first connecting lines may be parallel to the data lines, thus more facilitating wiring. Certainly, the first connecting lines may also be a metal layer disposed in the touch display panel and manufactured separately.

Figure 5:
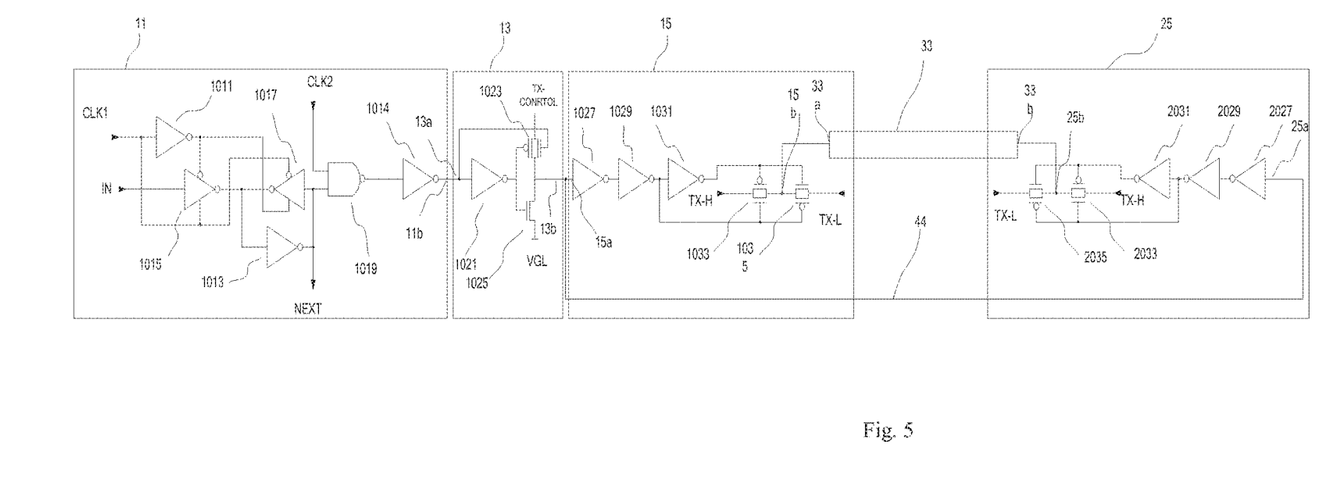
FIG. 5 is a schematic structural diagram of a drive circuit of a touch display panel, according to embodiments of the disclosure.

FIG. 5 is a schematic structural diagram of a drive circuit of a touch display panel, according to embodiments of the disclosure. The touch display panel includes a first shift register unit 11, a first multi-channel strobe unit 13, a first output unit 15, a touch drive electrode 33 and a second output unit 25. The first shift register unit 11 includes a first inverter 1011, a second inverter 1013, a third inverter 1014, a first three-state inverter 1015, a second three-state inverter 1017 and a first NAND gate 1019. Here, a first electrode of the first inverter 1011 is electrically connected with both a fourth electrode of the first three-state inverter 1015 and a third electrode of the second three-state inverter 1017 and is configured to receive a first clock signal CLK1, and a second electrode of the first inverter 1011 is electrically connected with a third electrode of the first three-state inverter 1015 and a fourth electrode of the second three-state inverter 1017. A first electrode of the second inverter 1013 is electrically connected with both a second electrode of the first three-state inverter 1015 and a second electrode of the second three-state inverter 1017. A second electrode of the second inverter 1013, a first electrode of the second three-state inverter 1017 and a second electrode of the first NAND gate 1019 are electrically connected together and electrically connected to an input end of the next drive circuit unit. The input end of this next drive circuit unit is an input end of the next adjacent shift register unit which is disposed on the same side of the touch display unit as the present first shift register unit. For example, as for two adjacent first drive circuit units a and b at the same side of the touch display unit, the input end of the next first drive circuit unit b refers to an input end of the next adjacent shift register unit which is disposed on the same side of the touch display unit as the first shift register unit in the first drive circuit unit a. A first electrode of the first three-state inverter 1015 functions as an input end of the first shift register unit 11. A first electrode of the first NAND gate 1019 is configured to receive a second clock signal CLK2, a third electrode of the first NAND gate 1019 is electrically connected with a first electrode of the third inverter 1014, and a second electrode of the third inverter 1014 functions as an output end 11b of the first shift register unit 11.

The first multi-channel strobe unit 13 includes a fourth inverter 1021, a first transmission gate 1023 and a first N-type transistor 1025. A first electrode of the fourth inverter 1021 functions as an input end 13a of the first multi-channel strobe unit 13 and is electrically connected with a second electrode of the first transmission gate 1023 and the second electrode of the third inverter 1014. A second electrode of the fourth inverter 1021 is electrically connected with a first electrode of the first transmission gate 1023 and a first electrode of the first N-type transistor 1025. A third electrode of the first transmission gate 1023 is configured to receive a touch drive control signal TX-CONTROL, and a fourth electrode of the first transmission gate 1023 is electrically connected with a second electrode of the first N-type transistor 1025. A third electrode of the first N-type transistor 1025 is configured to receive a low-level signal VGL. Here, the fourth electrode of the first transmission gate 1023 or the second electrode of the first N-type transistor 1025 functions as an output end 13b of the first multi-channel strobe unit 13.

The first output unit 15 includes a fifth inverter 1027, a sixth inverter 1029, a seventh inverter 1031, a second transmission gate 1033 and a third transmission gate 1035. Here, a first electrode of the fifth inverter 1027 functions as an input end 15a of the first output unit 15 and is electrically connected with the fourth electrode of the first transmission gate 1023 and the second electrode of the first N-type transistor 1025. A second electrode of the fifth inverter 1027 is electrically connected with a first electrode of the sixth inverter 1029, and a second electrode of the sixth inverter 1029 is electrically connected with a first electrode of the seventh inverter 1031, a second electrode of the second transmission gate 1033 and a first electrode of the third transmission gate 1035. A second electrode of the seventh inverter 1031 is electrically connected with a first electrode of the second transmission gate 1033 and a second electrode of the third transmission gate 1035. A third electrode of the second transmission gate 1033 and a third electrode of the third transmission gate 1035 are electrically connected together and form an output end 15b of the first output unit 15, and are further electrically connected with the first end 33a of the touch drive electrode 33. A fourth electrode of the second transmission gate 1033 is configured to receive a touch high-level signal TX-H, and the fourth electrode of the third transmission gate 1035 is configured to receive a touch low-level signal TX-L.

The second output unit 25 includes an eighth inverter 2027, a ninth inverter 2029, a tenth inverter 2031, a fourth transmission gate 2033 and a fifth transmission gate 2035. Here, a first electrode of the eighth inverter 2027 functions as an input end 25a of the second output unit 25, a second electrode of the eighth inverter 2027 is electrically connected with a first electrode of the ninth inverter 2029, and a second electrode of the ninth inverter 2029 is electrically connected with a first electrode of the tenth inverter 2031, a second electrode of the fourth transmission gate 2033 and a first electrode of the fifth transmission gate 2035. A second electrode of the tenth inverter 2031 is electrically connected with a first electrode of the fourth transmission gate 2033 and a second electrode of the fifth transmission gate 2035. A third electrode of the fourth transmission gate 2033 and a third electrode of the fifth transmission gate 2035 are electrically connected together and form an output end 25*b* of the second output unit 25, and are further electrically connected with a second end 33*b* of the touch drive electrode 33. A fourth electrode of the fourth transmission gate 2033 is configured to receive a touch high-level signal TX-H, and a fourth electrode of the fifth transmission gate 2035 is configured to receive a touch low-level signal TX-L.

The output end 13*b* of the first multi-channel strobe unit 13, namely the fourth electrode of the first transmission gate 1023 or the second electrode of the first N-type transistor 1025, is electrically connected with the input end 25*a* of the second output unit 25, namely the first electrode of the eighth inverter 2027, through a first connecting line 44. Referring to FIG. 5, in some embodiments, the first connecting lines 44 are metal transmission lines, thus alleviating problems such as a signal delay and a voltage drop, and maintaining the uniformity of signal transmission. Meanwhile, the shift register units are arranged only on one side of the touch display unit 5, thus the solution in some embodiments of the disclosure is advantageous in that the overall damage probability of the shift register units is reduced and the product yield is improved compared with a traditional solution where shift register units are arranged on two sides of the touch display unit.

Similarly, the first connecting lines 44 may be a metal layer disposed in the touch display panel and manufactured separately or may be manufactured on the same layer as a gate metal layer or a source-drain metal layer. With respect to FIG. 5, namely, the first shift register unit 11, the first multi-channel strobe unit 13, the first output unit 15 as well as the second output unit 25 are respectively disposed on the left and right sides of the touch drive electrode 33, the first connecting lines 44 may be a metal layer disposed in the touch display panel and manufactured separately or may be manufactured on the same layer as the gate metal layer, in some embodiments, the first connecting lines 44 are manufactured on the same layer as the gate metal layer. Because the gate metal layer is provided with gate scanning lines (not shown) running through the whole touch display panel in the transverse direction, when the first connecting lines 44 are manufactured on the same layer as the gate metal layer, the first connecting lines 44 may be parallel to the gate scanning lines, thus more facilitating wiring.

It should be noted that, the first shift register unit 11, the first multi-channel strobe unit 13, the first output unit 15 and the second output unit 25 are not limited to being disposed on the left and right sides of the touch drive electrode 33, but may be disposed on the upper and lower sides of the touch drive electrode 33. Where, the connection modes among the first shift register unit 11, the first multi-channel strobe unit 13, the first output unit 15, the second output unit 25 and the touch drive electrode 33 are the same as those of the foregoing embodiments. The difference lies in that when the first shift register unit 11, the first multi-channel strobe unit 13, the first output unit 15 as well as the second output unit 25 are respectively disposed on the upper and lower sides of the touch control display unit 5, in some embodiments, the first connecting lines are arranged on the same layer as the source-drain metal layer in the touch display panel. Because the source-drain metal layer is provided with data lines (not shown) running through the whole touch display panel in the longitudinal direction, when the first connecting lines are manufactured on the same layer as the source-drain metal layer, the first connecting lines may be parallel to the data lines, thus more facilitating wiring. Certainly, the first connecting lines may also be a metal layer disposed in the touch display panel and manufactured separately.

Figure 6:
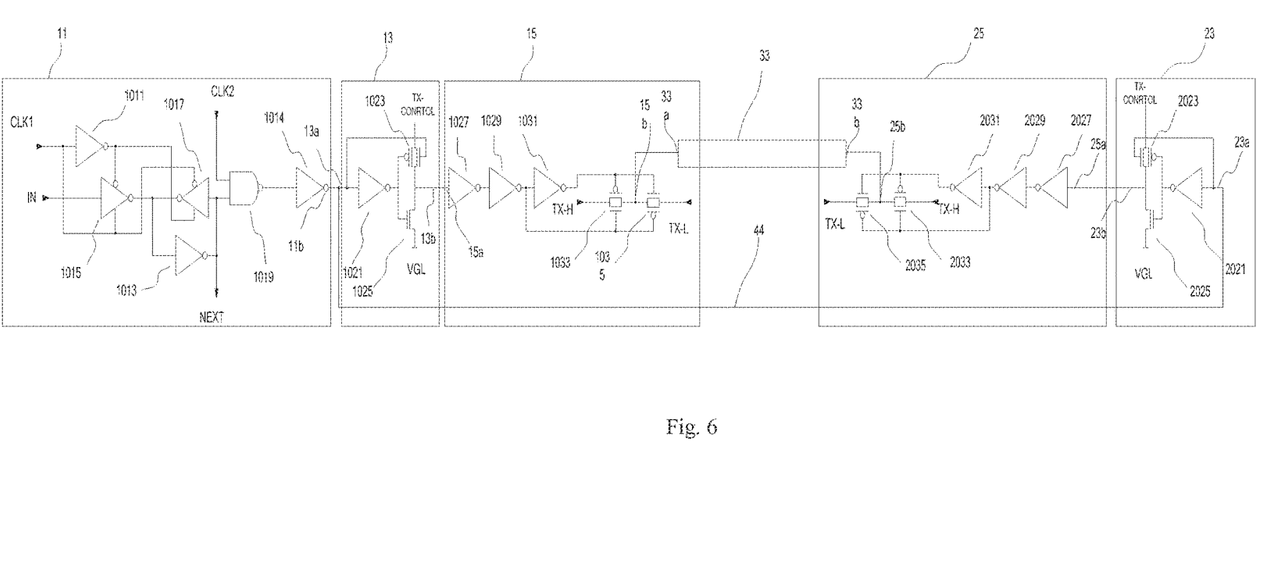
FIG. 6 is a schematic structural diagram of a drive circuit of another touch display panel, according to embodiments of the disclosure.

FIG. 6 is a schematic structural diagram of a drive circuit of another touch display panel, according to embodiments of the disclosure. The touch display panel includes a first shift register unit 11, a first multi-channel strobe unit 13, a first output unit 15, a touch drive electrode 33, a second multi-channel strobe unit 23 and a second output unit 25. The first shift register unit 11 includes a first inverter 1011, a second inverter 1013, a third inverter 1014, a first three-state inverter 1015, a second three-state inverter 1017 and a first NAND gate 1019. Where a first electrode of the first inverter 1011 is electrically connected with a fourth electrode of the first three-state inverter 1015 and a third electrode of the second three-state inverter 1017 and is configured to receive a first clock signal CLK1. A second electrode of the first inverter 1011 is electrically connected with a third electrode of the first three-state inverter 1015 and a fourth electrode of the second three-state inverter 1017. A first electrode of the second inverter 1013 is electrically connected with a second electrode of the first three-state inverter 1015 and a second electrode of the second three-state inverter 1017. A second electrode of the second inverter 1013, a first electrode of the second three-state inverter 1017 and a second electrode of the first NAND gate 1019 are electrically connected together and are electrically connected to an input end of the next drive circuit unit. The input end of the next drive circuit unit is the input end of the next adjacent shift register unit which is disposed on the same side as this first shift register unit. A first electrode of the first three-state inverter 1015 functions as an input end of the first shift register unit 11. A first electrode of the first NAND gate 1019 is configured to receive a second clock signal CLK2, a third electrode of the first NAND gate 1019 is electrically connected with a first electrode of the third inverter 1014, and a second electrode of the third inverter 1014 functions as an output end 11*b* of the first shift register unit 11.

The first multi-channel strobe unit 13 includes a fourth inverter 1021, a first transmission gate 1023 and a first N-type transistor 1025. Here a first electrode of the fourth inverter 1021 functions as an input end 13*a* of the first multi-channel strobe unit 13 and is electrically connected with a second electrode of the first transmission gate 1023 and the second electrode of the third inverter 1014. A second electrode of the fourth inverter 1021 is electrically connected with a first electrode of the first transmission gate 1023 and a first electrode of the first N-type transistor 1025. A third electrode of the first transmission gate 1023 is configured to receive a touch drive control signal TX-CONTROL, a fourth electrode of the first transmission gate 1023 is electrically connected with a second electrode of the first N-type transistor 1025, and a third electrode of the first N-type transistor 1025 is configured to receive a low-level signal VGL. Here, the fourth electrode of the first transmission gate 1023 or the second electrode of the first N-type transistor 1025 functions as an output end 13*b* of the first multi-channel strobe unit 13.

The first output unit 15 includes a fifth inverter 1027, a sixth inverter 1029, a seventh inverter 1031, a second transmission gate 1033 and a third transmission gate 1035. Here a first electrode of the fifth inverter 1027 functions as an input end 15a of the first output unit 15 and is electrically connected with the fourth electrode of the first transmission gate 1023 and the second electrode of the first N-type transistor 1025, a second electrode of the fifth inverter 1027 is electrically connected with a first electrode of the sixth inverter 1029, and a second electrode of the sixth inverter 1029 is electrically connected with a first electrode of the seventh inverter 1031, a second electrode of the second transmission gate 1033 and a first electrode of the third transmission gate 1035. A second electrode of the seventh inverter 1031 is electrically connected with a first electrode of the second transmission gate 1033 and a second electrode of the third transmission gate 1035. A third electrode of the second transmission gate 1033 and a third electrode of the third transmission gate 1035 are electrically connected together and form an output end 15b of the first output unit 15, and are electrically connected with a first end 33a of the touch drive electrode 33. A fourth electrode of the second transmission gate 1033 is configured to receive a touch high-level signal TX-H, and a fourth electrode of the third transmission gate 1035 is configured to receive a touch low-level signal TX-L.

The second multi-channel strobe unit 23 includes an eleventh inverter 2021, a sixth transmission gate 2023 and a second N-type transistor 2025. Here, a first electrode of the eleventh inverter 2021 functions as an input end 23a of the second multi-channel strobe unit 23 and is electrically connected with a second gate of the sixth transmission gate 2023, and a second electrode of the eleventh inverter 2021 is electrically connected with a first electrode of the sixth transmission gate 2023 and a first electrode of the second N-type transistor 2025. A third electrode of the sixth transmission gate 2023 is configured to receive a touch drive control signal TX-CONTROL, and a fourth electrode of the sixth transmission gate 2023 and a second electrode of the second N-type transistor 2025 are electrically connected together and form an output end 23b of the second multi-channel strobe unit 23, and are electrically connected with a first electrode of an eighth inverter 2027.

The second output unit 25 includes the eighth inverter 2027, a ninth inverter 2029, a tenth inverter 2031, a fourth transmission gate 2033 and a fifth transmission gate 2035. Here, a first electrode of the eighth inverter 2027 functions as an input end 25a of the second output unit 25, a second electrode of the eighth inverter 2027 is electrically connected with a first electrode of the ninth inverter 2029, and a second electrode of the ninth inverter 2029 is electrically connected with a first electrode of the tenth inverter 2031, a second electrode of the fourth transmission gate 2033 and a first electrode of the fifth transmission gate 2035. A second electrode of the tenth inverter 2031 is electrically connected with a first electrode of the fourth transmission gate 2033 and a second electrode of the fifth transmission gate 2035. A third electrode of the fourth transmission gate 2033 and a third electrode of the fifth transmission gate 2035 are electrically connected together and form an output end 25b of the second output unit 25, and are electrically connected with a second end 33b of the touch drive electrode 33. A fourth electrode of the fourth transmission gate 2033 is configured to receive a touch high-level signal TX-H, and a fourth electrode of the fifth transmission gate 2035 is configured to receive a touch low-level signal TX-L.

The output end 11b of the first shift register unit 11, namely the second electrode of the third inverter 1014, is electrically connected with the input end 23a of the second multi-channel strobe unit 23, namely the first electrode of the eleventh inverter 2021, through a first connecting line 44. Referring to FIG. 6, in some embodiments, the first connecting lines 44 are metal transmission lines, thus alleviating problems such as a signal delay and a voltage drop, and maintaining the uniformity of signal transmission. Meanwhile, the shift register units are arranged only on one side of the touch display unit 5, thus the solution in some embodiments of the disclosure is advantageous in that the overall damage probability of the shift register units is reduced and the product yield is improved compared with a traditional scheme where shift register units are arranged on two sides of the touch display unit.

Similarly, the first connecting lines 44 may be a metal layer disposed in the touch display panel and manufactured separately or may be manufactured on the same layer as a gate metal layer or a source-drain metal layer. Referring to FIG. 6, the first shift register unit 11, the first multi-channel strobe unit 13, the first output unit 15 as well as the second multi-channel strobe unit 23, the second output unit 25 are respectively disposed on the left and right sides of the touch drive electrode 33, the first connecting lines 44 may be a metal layer disposed in the touch display panel and manufactured separately or may be manufactured on the same layer as the gate metal layer, preferably, the first connecting lines 44 are manufactured on the same layer as the gate metal layer. Because the gate metal layer is provided with gate scanning lines (not shown) running through the whole touch display panel in the transverse direction, when the first connecting lines 44 are manufactured on the same layer as the gate metal layer, the first connecting lines 44 may be parallel to the gate scanning lines, thus more facilitating wiring.

It should be noted that, the first shift register unit 11, the first multi-channel strobe unit 13, the first output unit 15, the second multi-channel strobe unit 23 and the second output unit 25 are not limited to being disposed on the left and right sides of the touch drive electrode 33, but may be disposed on the upper and lower sides of the touch drive electrode 33. Where, the connection modes among the first shift register unit 11, the first multi-channel strobe unit 13, the first output unit 15, the second multi-channel strobe unit 23, the second output unit 25 and the touch drive electrode 33 are the same as those of the foregoing embodiments. The difference lies in that when the first shift register unit 11, the first multi-channel strobe unit 13, the first output unit 15 as well as the second multi-channel strobe unit 23, the second output unit 25 are respectively disposed on the upper and lower sides of the touch control display unit 5, preferably, the first connecting lines are arranged on the same layer as the source-drain metal layer in the touch display panel. Because the source-drain metal layer is provided with data lines (not shown) running through the whole touch display panel in the longitudinal direction, when the first connecting lines are manufactured on the same layer as the source-drain metal layer, the first connecting lines may be parallel to the data lines, thus more facilitating wiring. Certainly, the first connecting lines may also be a metal layer disposed in the touch display panel and manufactured separately.

Figure 7:
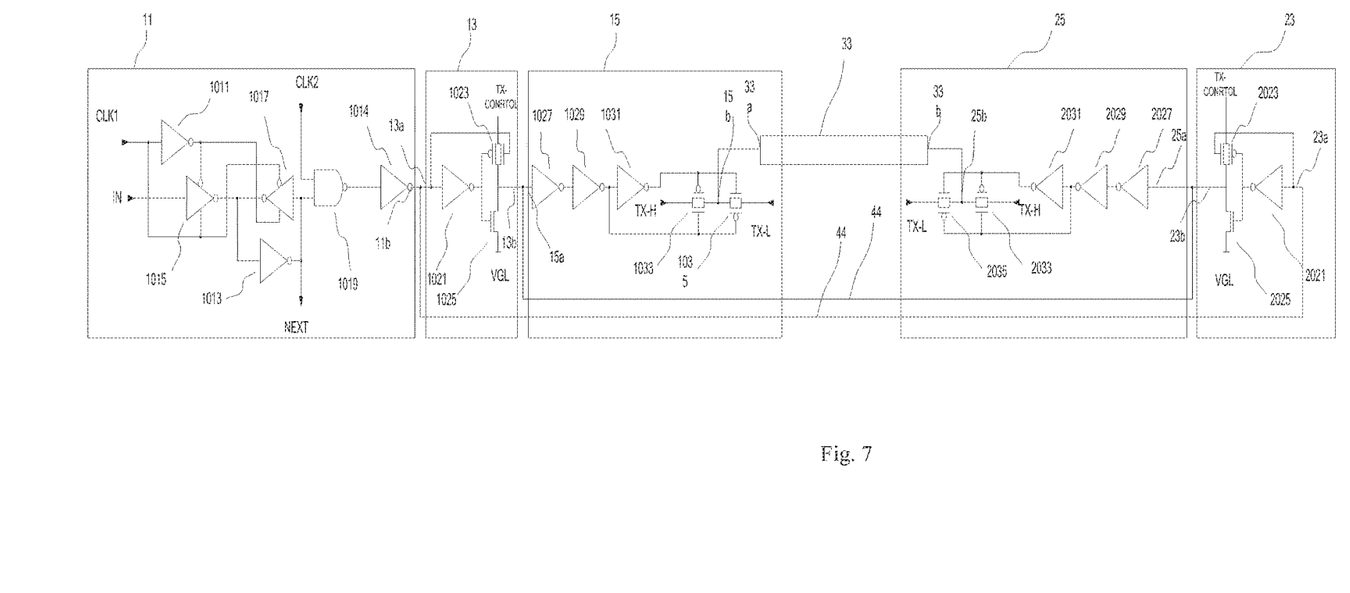
FIG. 7 is a schematic structural diagram of a drive circuit of another touch display panel, according to embodiments of the disclosure.

FIG. 7 is a schematic structural diagram of a drive circuit of another touch display panel, according to embodiments of the disclosure. The touch display panel includes a first shift register unit 11, a first multi-channel strobe unit 13, a first output unit 15, a touch drive electrode 33, a second multi-channel strobe unit 23 and a second output unit 25. The first shift register unit 11 includes a first inverter 1011, a second inverter 1013, a third inverter 1014, a first three-state inverter 1015, a second three-state inverter 1017 and a first NAND gate 1019. Where a first electrode of the first inverter 1011 is electrically connected with a fourth electrode of the first three-state inverter 1015 and a third electrode of the second three-state inverter 1017 and is configured to receive a first clock signal CLK1. A second electrode of the first inverter 1011 is electrically connected with a third electrode of the first three-state inverter 1015 and a fourth electrode of the second three-state inverter 1017. A first electrode of the second inverter 1013 is electrically connected with a second electrode of the first three-state inverter 1015 and a second electrode of the second three-state inverter 1017. A second electrode of the second inverter 1013, a first electrode of the second three-state inverter 1017 and a second electrode of the first NAND gate 1019 are electrically connected together and are electrically connected to an input end of the next drive circuit unit. The input end of the next drive circuit unit is the input end of next adjacent shift register unit which is disposed on the same side as this first shift register unit. A first electrode of the first three-state inverter 1015 functions as an input end of the first shift register unit 11. A first electrode of the first NAND gate 1019 is configured to receive a second clock signal CLK2, a third electrode of the first NAND gate 1019 is electrically connected with a first electrode of the third inverter 1014, and a second electrode of the third inverter 1014 functions as an output end 11b of the first shift register unit 11.

The first multi-channel strobe unit 13 includes a fourth inverter 1021, a first transmission gate 1023 and a first N-type transistor 1025. Here, a first electrode of the fourth inverter 1021 functions as an input end 13a of the first multi-channel strobe unit 13 and is electrically connected with a second electrode of the first transmission gate 1023 and the second electrode of the third inverter 1014. A second electrode of the fourth inverter 1021 is electrically connected with a first electrode of the first transmission gate 1023 and a first electrode of the first N-type transistor 1025. A third electrode of the first transmission gate 1023 is configured to receive a touch drive control signal TX-CONTROL, a fourth electrode of the first transmission gate 1023 is electrically connected with a second electrode of the first N-type transistor 1025, and a third electrode of the first N-type transistor 1025 is configured to receive a low-level signal VGL. Here, the fourth electrode of the first transmission gate 1023 or the second electrode of the first N-type transistor 1025 functions as an output end 13b of the first multi-channel strobe unit 13.

The first output unit 15 includes a fifth inverter 1027, a sixth inverter 1029, a seventh inverter 1031, a second transmission gate 1033 and a third transmission gate 1035. Here, a first electrode of the fifth inverter 1027 functions as an input end 15a of the first output unit 15 and is electrically connected with the fourth electrode of the first transmission gate 1023 and the second electrode of the first N-type transistor 1025, a second electrode of the fifth inverter 1027 is electrically connected with a first electrode of the sixth inverter 1029, and a second electrode of the sixth inverter 1029 is electrically connected with a first electrode of the seventh inverter 1031, a second electrode of the second transmission gate 1033 and a first electrode of the third transmission gate 1035. A second electrode of the seventh inverter 1031 is electrically connected with a first electrode of the second transmission gate 1033 and a second electrode of the third transmission gate 1035. A third electrode of the second transmission gate 1033 and a third electrode of the third transmission gate 1035 are electrically connected together and form an output end 15b of the first output unit 15, and are electrically connected with a first end 33a of the touch drive electrode 33. A fourth electrode of the second transmission gate 1033 is configured to receive a touch high-level signal TX-H, and a fourth electrode of the third transmission gate 1035 is configured to receive a touch low-level signal TX-L.

The second multi-channel strobe unit 23 includes an eleventh inverter 2021, a sixth transmission gate 2023 and a second N-type transistor 2025. Here, a first electrode of the eleventh inverter 2021 functions as an input end 23a of the second multi-channel strobe unit 23 and is electrically connected with a second gate of the sixth transmission gate 2023, and a second electrode of the eleventh inverter 2021 is electrically connected with a first electrode of the sixth transmission gate 2023 and a first electrode of the second N-type transistor 2025. A third electrode of the sixth transmission gate 2023 is configured to receive a touch drive control signal TX-CONTROL, and a fourth electrode of the sixth transmission gate 2023 and a second electrode of the second N-type transistor 2025 are electrically connected together and form an output end 23b of the second multi-channel strobe unit 23, and are electrically connected with a first electrode of an eighth inverter 2027.

The second output unit 25 includes the eighth inverter 2027, a ninth inverter 2029, a tenth inverter 2031, a fourth transmission gate 2033 and a fifth transmission gate 2035. Here, a first electrode of the eighth inverter 2027 functions as an input end 25a of the second output unit 25, a second electrode of the eighth inverter 2027 is electrically connected with a first electrode of the ninth inverter 2029, and a second electrode of the ninth inverter 2029 is electrically connected with a first electrode of the tenth inverter 2031, a second electrode of the fourth transmission gate 2033 and a first electrode of the fifth transmission gate 2035. A second electrode of the tenth inverter 2031 is electrically connected with a first electrode of the fourth transmission gate 2033 and a second electrode of the fifth transmission gate 2035. A third electrode of the fourth transmission gate 2033 and a third electrode of the fifth transmission gate 2035 are electrically connected together and form an output end 25b of the second output unit 25, and are electrically connected with a second end 33b of the touch drive electrode 33. A fourth electrode of the fourth transmission gate 2033 is configured to receive a touch high-level signal TX-H, and a fourth electrode of the fifth transmission gate 2035 is configured to receive a touch low-level signal TX-L.

The output end 11b of the first shift register unit 11, namely the second electrode of the third inverter 1014, is electrically connected with the input end 23a of the second multi-channel strobe unit 23, namely the first electrode of the eleventh inverter 2021, through a first connecting line 44. Meanwhile, the output end 13b of the first multi-channel strobe unit 13, namely the fourth electrode of the first transmission gate 1023 or the second electrode of the first N-type transistor 1025, is electrically connected with the input end 25a of the second output unit 25, namely the first electrode of the eighth inverter 2027, through a first connecting line 44. Referring to FIG. 7, in some embodiments, the first connecting lines 44 are metal transmission lines, thus alleviating problems such as a signal delay and a voltage drop, and maintaining the uniformity of signal transmission. Meanwhile, the shift register units are arranged only on one side of the touch display unit 5, thus the solution in some embodiments of the disclosure is advantageous in that the overall damage probability of the shift register units is reduced and the product yield is improved compared with a traditional solution where shift register units are arranged on two sides of the touch display unit.

Similarly, the first connecting lines 44 may be a metal layer disposed in the touch display panel and manufactured separately or may be manufactured on the same layer as a gate metal layer or a source-drain metal layer. Referring to FIG. 7, the first shift register unit 11, the first multi-channel strobe unit 13, the first output unit 15 as well as the second multi-channel strobe unit 23, and the second output unit 25 are respectively disposed on the left and right sides of the touch drive electrode 33, the first connecting lines 44 may be a metal layer disposed in the touch display panel and manufactured separately or may be manufactured on the same layer as the gate metal layer, in some embodiments, the first connecting lines 44 are manufactured on the same layer as the gate metal layer. Because the gate metal layer is provided with gate scanning lines (not shown) running through the whole touch display panel in the transverse direction, when the first connecting lines 44 are manufactured on the same layer as the gate metal layer, the first connecting lines 44 may be parallel to the gate scanning lines, thus more facilitating wiring.

It should be noted that, the first shift register unit 11, the first multi-channel strobe unit 13, the first output unit 15, the second multi-channel strobe unit 23 and the second output unit 25 are not limited to being disposed on the left and right sides of the touch drive electrode 33, but may be disposed on the upper and lower sides of the touch drive electrode 33. Where, the connection modes among the first shift register unit 11, the first multi-channel strobe unit 13, the first output unit 15, the second multi-channel strobe unit 23, the second output unit 25 and the touch drive electrode 33 are the same as those of the foregoing embodiments. The difference lies in that when the first shift register unit 11, the first multi-channel strobe unit 13, the first output unit 15 as well as the second multi-channel strobe unit 23, the second output unit 25 are respectively disposed on the upper and lower sides of the touch control display unit 5, in some embodiments, the first connecting lines are arranged on the same layer as the source-drain metal layer in the touch display panel. Because the source-drain metal layer is provided with data lines (not shown) running through the whole touch display panel in the longitudinal direction, when the first connecting lines are manufactured on the same layer as the source-drain metal layer, the first connecting lines may be parallel to the data lines, thus more facilitating wiring. Certainly, the first connecting lines may also be a metal layer positioned in the touch display panel and manufactured separately.

Figure 8:
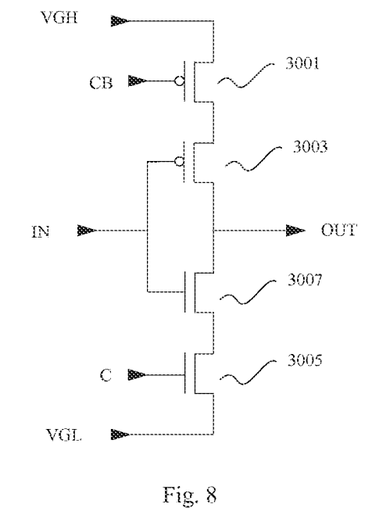
FIG. 8 is a schematic structural diagram of a circuit of a three-state inverter, according to embodiments of the disclosure.

It should be noted that, for the circuit structure of each of the first three-state inverter 1015 and the second three-state inverter 1017 in embodiments shown in FIG. 5, FIG. 6 and FIG. 7, reference is made to FIG. 8. Each three-state inverter includes a first P-type transistor 3001, a second P-type transistor 3003, a first N-type transistor 3005 and a second N-type transistor 3007. Where a first electrode (gate) of the first P-type transistor 3001 is used as a reverse control signal end CB, namely the third electrode of the first three-state inverter 1015 and the second three-state inverter 1017 in embodiments shown in FIG. 5, FIG. 6 and FIG. 7, a second electrode of the first P-type transistor 3001 is configured to receive a high-level signal VGH, and a third electrode of the first P-type transistor 3001 is electrically connected with a second electrode of the second P-type transistor 3003. A first electrode (gate) of the second P-type transistor 3003 and a first electrode (gate) of the second N-type transistor 3007 are electrically connected together and form an input end IN of the three-state inverter together, namely the first electrode of the first three-state inverter 1015 and the second three-state inverter 1017 in embodiments shown in FIG. 5, FIG. 6 and FIG. 7. A third electrode of the second P-type transistor 3003 and a second electrode of a second N-type transistor 3007 are electrically connected together and form an output end OUT of the three-state inverter together, namely the second electrode of the first three-state inverter 1015 and the second three-state inverter 1017 in embodiments shown in FIG. 5, FIG. 6 and FIG. 7. A third electrode of the second N-type transistor 3007 is electrically connected with a second electrode of the first N-type transistor 3005. A first electrode (gate) of the first N-type transistor 3005 is used as a control signal end C, namely the fourth electrode of the first three-state inverter 1015 and the second three-state inverter 1017 in embodiments shown in FIG. 5, FIG. 6 and FIG. 7. A third electrode of the first N-type transistor 3005 is configured to receive a low-level signal VGL.

Figure 9:
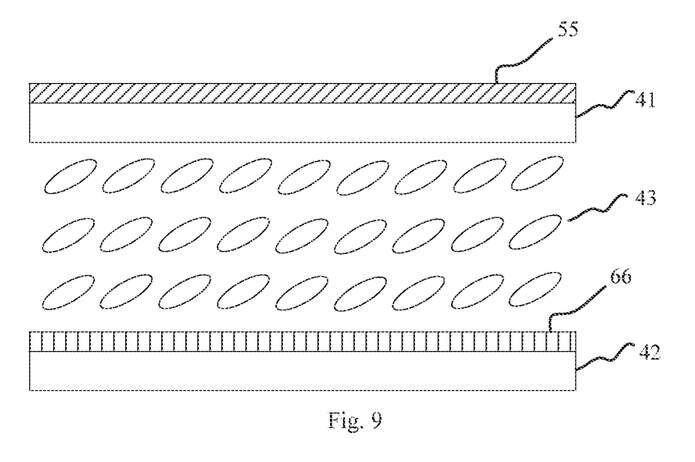
FIG. 9 is a sectional diagram of a touch display panel, according to embodiments of the disclosure.

FIG. 9 is a structural diagram of a touch display panel, according to embodiments of the disclosure. The touch display panel includes a first substrate 41, a second substrate 42, and a display functional layer 43 positioned between the first substrate 41 and the second substrate 42. A touch detection electrode layer 55 is arranged on one side, back to the display functional layer 43, of the first substrate 41. The touch detection electrode layer 55 is provided with a plurality of touch detection electrodes (not shown). A touch drive electrode layer 66 is arranged between the first substrate 41 and the second substrate 42. The touch drive electrode layer 66 is provided with a plurality of touch drive electrodes (not shown) which alternate with the touch detection electrodes to form a capacitive structure therebetween. It should be noted that, the touch drive electrode 66 is not limited to the position shown in FIG. 8, and may be positioned on one side, facing the display functional layer 43, of the first substrate 41. In addition, the touch display panel further includes a common electrode layer, which may be arranged on the same layer as the touch drive electrode layer 66, namely the touch drive electrodes are used as common electrodes. The common electrode layer (not shown) may also not be arranged on the same layer as the touch drive electrode layer 66 but separately arranged. The common electrode layer may be positioned at any position between the first substrate 41 and the second substrate 42, which is not redundantly described.

Figure 10:
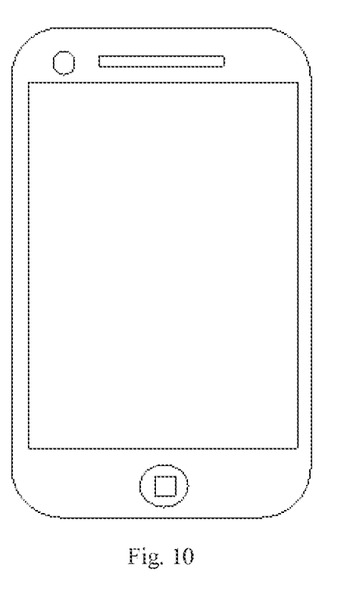
FIG. 10 is a schematic diagram of electronic equipment, according to embodiments of the disclosure.

FIG. 10 is electronic equipment, according to embodiments of the disclosure. The electronic equipment may be a mobile phone shown in FIG. 10 or a touch device such as a computer and the like. The electronic equipment includes the touch display panel of any embodiments of the disclosure.

With the touch display panel and the electronic equipment provided by the embodiments of the disclosure, single-side scanning drive and double-side signal transmission may be realized, the synchronism of signals is improved based on the improved yield, and the problem of voltage drop is solved.

Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

We claim:
1. A touch display panel, comprising:
a touch display unit and drive circuit units disposed at the periphery of the touch display unit, wherein the touch display unit comprises touch drive electrodes, the drive circuit unit comprises a first drive circuit unit and a second drive circuit unit which are electrically connected with two ends of each of the touch drive electrodes, respectively, and the first drive circuit unit is electrically connected with the second drive circuit unit through a first connecting line;
wherein the first drive circuit unit comprises a first shift register unit, a first multi-channel strobe unit and a first output unit which are sequentially electrically connected, an output end of the first output unit is electrically connected with a first end of the touch drive electrode, and the second drive circuit unit comprises a second output unit, an output end of the second output unit is electrically connected with a second end of the touch drive electrode;
wherein the first shift register unit comprises a first inverter, a second inverter, a third inverter, a first three-state inverter, a second three-state inverter and a first NAND gate,
wherein a first electrode of the first inverter is electrically connected with a fourth electrode of the first three-state inverter and a third electrode of the second three-state inverter and is configured to receive a first clock signal, and a second electrode of the first inverter is electrically connected with a third electrode of the first three-state inverter and a fourth electrode of the second three-state inverter;
a first electrode of the second inverter is electrically connected with a second electrode of the first three-state inverter and a second electrode of the second three-state inverter; a second electrode of the second inverter, a first electrode of the second three-state inverter and a second electrode of the first NAND gate are electrically connected together and are electrically connected to an input end of a next drive circuit unit; and the input end of the next drive circuit unit is an input end of a next adjacent shift register unit which is disposed on the same side as the present first shift register unit;
a first electrode of the first three-state inverter is an input end of the first shift register unit;
a first electrode of the first NAND gate is configured to receive a second clock signal, a third electrode of the first NAND gate is electrically connected with a first electrode of the third inverter, and a second electrode of the third inverter is an output end of the first shift register unit;
the first multi-channel strobe unit comprises a fourth inverter, a first transmission gate and a first N-type transistor, wherein:
a first electrode of the fourth inverter is an input end of the first multi-channel strobe unit and is electrically connected with a second electrode of the first transmission gate and the second electrode of the third inverter, and a second electrode of the fourth inverter is electrically connected with a first electrode of the first transmission gate and a first electrode of the first N-type transistor;
a third electrode of the first transmission gate is configured to receive a touch drive control signal, a fourth electrode of the first transmission gate is electrically connected with a second electrode of the first N-type transistor, and a third electrode of the first N-type transistor is configured to receive a low-level signal, wherein the fourth electrode of the first transmission gate or the second electrode of the first N-type transistor is an output end of the first multi-channel strobe unit;
the first output unit comprises a fifth inverter, a sixth inverter, a seventh inverter, a second transmission gate and a third transmission gate, wherein:
a first electrode of the fifth inverter is an input end of the first output unit and is electrically connected with the fourth electrode of the first transmission gate and the second electrode of the first N-type transistor, a second electrode of the fifth inverter is electrically connected with a first electrode of the sixth inverter, and a second electrode of the sixth inverter is electrically connected with a first electrode of the seventh inverter, a second electrode of the second transmission gate and a first electrode of the third transmission gate;
a second electrode of the seventh inverter is electrically connected with a first electrode of the second transmission gate and a second electrode of the third transmission gate and is electrically connected with a first end of the touch drive electrode;
a third electrode of the second transmission gate and a third electrode of the third transmission gate are electrically connected together and form an output end of the first output unit;
a fourth electrode of the second transmission gate is configured to receive a touch high-level signal, and the fourth electrode of the third transmission gate is configured to receive a touch low-level signal;
the second output unit comprises an eighth inverter, a ninth inverter, a tenth inverter, a fourth transmission gate and a fifth transmission gate, wherein:
a first electrode of the eighth inverter is an input end of the second output unit, a second electrode of the eighth inverter is electrically connected with a first electrode of the ninth inverter, and a second electrode of the ninth inverter is electrically connected with a first electrode of the tenth inverter, a second electrode of the fourth transmission gate and a first electrode of the fifth transmission gate;
a second electrode of the tenth inverter is electrically connected with a first electrode of the fourth transmission gate and a second electrode of the fifth transmission gate;
a third electrode of the fourth transmission gate and a third electrode of the fifth transmission gate are electrically connected together and form an output end of the second output unit, and are electrically connected with a second end of the touch drive electrode; and
a fourth electrode of the fourth transmission gate is configured to receive a touch high-level signal, and a fourth electrode of the fifth transmission gate is configured to receive a touch low-level signal.
2. The touch display panel of claim 1, wherein an output end of the first multi-channel strobe unit is electrically connected with an input end of the second output unit through the first connecting line.
3. The touch display panel of claim 1, wherein the second drive circuit unit further comprises a second multi-channel strobe unit, and an output end of the first shift register unit is electrically connected with an input end of the second multi-channel strobe unit through the first connecting line.

4. The touch display panel of claim 3, wherein an output end of the first multi-channel strobe unit is electrically connected with an input end of the second output unit through the first connecting line.

5. The touch display panel of claim 1, wherein the first electrode of the fifth inverter is electrically connected with the first electrode of the eighth inverter through the first connecting line.

6. The touch display panel of claim 1, wherein the second drive circuit unit further comprises a second multi-channel strobe unit, which comprises an eleventh inverter, a sixth transmission gate and a second N-type transistor, wherein:
   a first electrode of the eleventh inverter is an input end of the second multi-channel strobe unit and is electrically connected with a second gate of the sixth transmission gate, and a second electrode of the eleventh inverter is electrically connected with a first electrode of the sixth transmission gate and a first electrode of the second N-type transistor;
   a third electrode of the sixth transmission gate is configured to receive a touch drive control signal, and a fourth electrode of the sixth transmission gate and a second electrode of the second N-type transistor are electrically connected together and form an output end of the second multi-channel strobe unit, and are electrically connected with a first electrode of the eighth inverter; and
   wherein, the first electrode of the fourth inverter is electrically connected with the first electrode of the eleventh inverter through the first connecting line.

7. The touch display panel of claim 6, wherein the first electrode of the fifth inverter is electrically connected with the first electrode of the eighth inverter through the first connecting line.

8. The touch display panel of claim 1, wherein the touch display unit comprises:
   a first substrate; a second substrate disposed opposite to the first substrate; touch detection electrodes disposed between the first substrate and the second substrate; and touch detection electrodes disposed on one side, which is away from the second substrate, of the first substrate.

9. The touch display panel of claim 8, wherein the touch display unit further comprises common electrodes, and the common electrodes and the touch drive electrodes are arranged on the same layer.

10. Electronic equipment, comprising the touch display panel of claim 1.

11. The touch display panel of claim 1, wherein the touch display unit further comprises a gate metal layer and a source-drain layer, and the first connecting lines are arranged on the same layer as the gate metal layer or the source-drain metal layer.

* * * * *